(12) United States Patent
Asmari et al.

(10) Patent No.: US 12,008,780 B2
(45) Date of Patent: *Jun. 11, 2024

(54) SYSTEM AND METHOD FOR DATA ACQUISITION

(71) Applicant: ULC Technologies, LLC, Hauppauge, NY (US)

(72) Inventors: Ali Asmari, Selden, NY (US); Xinghua Jia, Bellmore, NY (US); Robert E. Kodadek, Long Beach, NY (US)

(73) Assignee: ULC Technologies, LLC, Hauppauge, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/815,192

(22) Filed: Jul. 26, 2022

(65) Prior Publication Data

US 2023/0010498 A1 Jan. 12, 2023

Related U.S. Application Data

(63) Continuation of application No. 16/595,878, filed on Oct. 8, 2019, now Pat. No. 11,398,040.

(Continued)

(51) Int. Cl.
| | |
|---|---|
| *G06V 20/10* | (2022.01) |
| *B25J 9/16* | (2006.01) |
| *G06T 7/33* | (2017.01) |
| *G06T 7/593* | (2017.01) |
| *G06V 10/75* | (2022.01) |

(Continued)

(52) U.S. Cl.
CPC ............... *G06T 7/593* (2017.01); *B25J 9/162* (2013.01); *B25J 9/1664* (2013.01); *G06T 7/337* (2017.01); *G06V 10/751* (2022.01); *G06V 10/757* (2022.01); *G06V 20/10* (2022.01); *G06V 20/17* (2022.01); *G06V 20/182* (2022.01); *G06V 20/56* (2022.01); *G06V 40/20* (2022.01)

(58) Field of Classification Search
CPC ........... G06T 7/593; G06T 2207/10021; G06T 7/337; G06K 9/6202
See application file for complete search history.

(56) References Cited

U.S. PATENT DOCUMENTS

| | | |
|---|---|---|
| 7,623,248 B2 | 11/2009 | Laflamme |
| 10,380,423 B2 | 8/2019 | Pittman et al. |

(Continued)

FOREIGN PATENT DOCUMENTS

| | | |
|---|---|---|
| WO | 2017172778 A1 | 10/2017 |
| WO | 2018071416 A1 | 4/2018 |
| WO | 2019060745 A2 | 3/2019 |

OTHER PUBLICATIONS

Search Report re App. No. GB1914524.2 dated Aug. 24, 2021.

(Continued)

*Primary Examiner* — Sam Bhattacharya
(74) *Attorney, Agent, or Firm* — Husch Blackwell LLP

(57) ABSTRACT

A system and method for pipeline data acquisition may include a software program that can autonomously review new and legacy videos collected by camera-equipped robotic systems from inside the pipelines, and automatically detect and categorize different features. Three-dimensional (3-D) point cloud may also be generated using software algorithms that stitch together like features in different video frames.

20 Claims, 11 Drawing Sheets

Related U.S. Application Data

(60) Provisional application No. 62/742,614, filed on Oct. 8, 2018.

(51) Int. Cl.
  *G06V 20/17* (2022.01)
  *G06V 20/56* (2022.01)
  *G06V 40/20* (2022.01)

(56) References Cited

U.S. PATENT DOCUMENTS

| | | | |
|---|---|---|---|
| 11,398,040 B2 * | 7/2022 | Asmari | G06V 10/751 |
| 2021/0020073 A1 | 1/2021 | Asmari et al. | |

OTHER PUBLICATIONS

Intention to Grant re App. No. GB1914524.2 dated Aug. 24, 2021.
Combined Search and Examination Report Under Sections 17 & 18(3) re App. No. GB1914524.2 dated Aug. 4, 2020.
Search Report re App. No. GB1914524.2 dated Jul. 17, 2020.
Paz et al., Large-Scale 6-DOF Slam With Stereo-in-Hand, IEEE Transactions on Robotics, pp. 947-957, vol. 24, 2008.
Shen et al., Vision-Based State Estimation for Autonomous Rotorcraft MAVs in Complex Environments, pp. P58-P1764, IEEE International Conference on Robotics and Automation, 2013.
Hochdorfer et al., 6 DoF SLAM using a ToF Camera: The Challenge of a continuously growing number of landmarks, pp. 3981-3986, Intelligent Robots and Systems {IROS), 2010.
Prusak et al., Abstract of Post Estimation and Map Building with a Time-of_Flight-Camera for Robot Navigation, International Journal of Intelligent Systems Technologies and Applications, Nov. 2018.
Yatim et al., Automated Mapping for Underground Pipelines: An Overview, 2nd International Conference on Electrical Electronics and System Engineering (ICEESE), 2014.

* cited by examiner

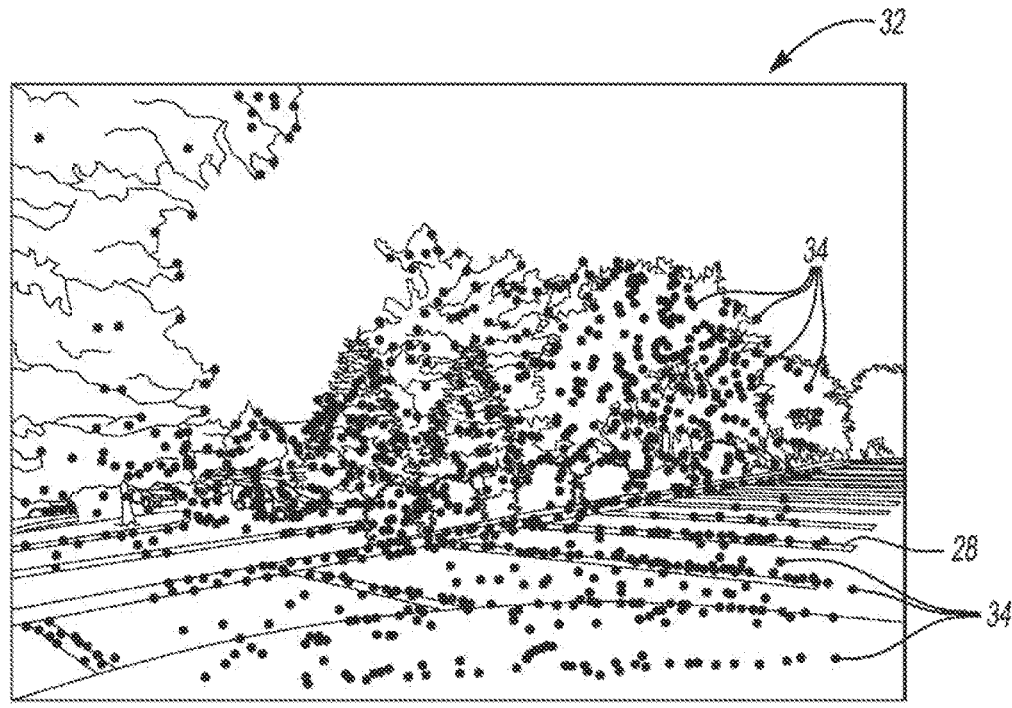
_Fig-3B_
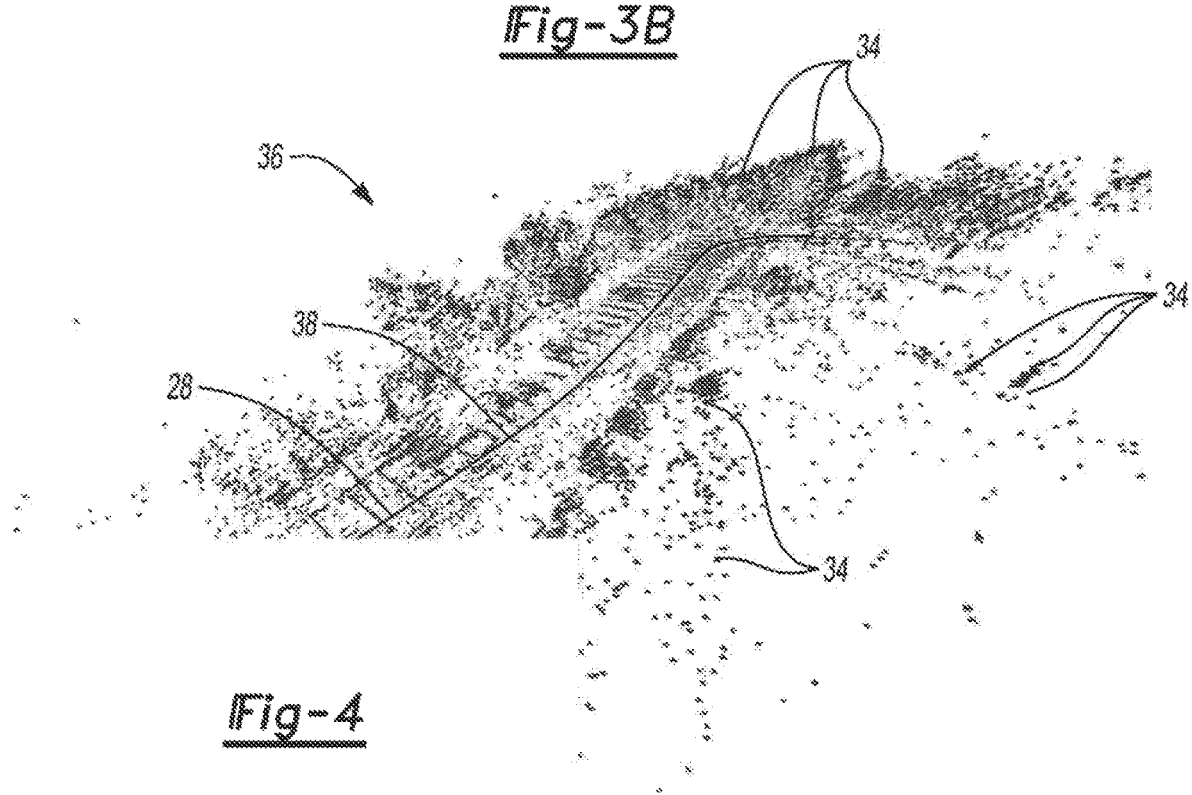
_Fig-4_

| Above Ground and In-Pipe Data Integration | Prior to Launch | During Launch | After Launch |
|---|---|---|---|
| Above Ground Data Collector | Collecting Data from the Launch Site | Collecting Data from the Launch Site | Collecting Data from Above the Ground; Locate the Robot Sporadically |
| In-Pipe Data Collector | Collecting Data from the Launch Site | Collecting Data Inside the Launch Tube | Collecting Data from Inside the Pipe |
| Data Processing Software | Correlate and Fuse the Data from Different Devices | | Correlate and Fuse the Data to Pre-Launch Data |

Fig-13

SYSTEM AND METHOD FOR DATA ACQUISITION

CROSS REFERENCE TO RELATED APPLICATIONS

This application claims the benefit of U.S. provisional application Ser. No. 62/742,614 filed Oct. 8, 2018, which is hereby incorporated in its entirety by reference herein.

TECHNICAL FIELD

The present disclosure relates to a system and method for data acquisition.

BACKGROUND

In order to efficiently plan and conduct excavation and repair operations on buried infrastructure, accurate maps of the below-ground pipe and conduit networks are critical to eliminate "dry holes", improve efficiency, and reduce the costs associated with planning and performing excavation. The effectiveness of traditional locating techniques in the gas, water, electric, and sewer industries is hampered by inaccurate and outdated mapping techniques. In many cases, traditional mark-out is incomplete or not accurate enough it; avoid damage to third-party systems, enable the use of efficient keyhole and small-hole techniques, or provide the utility company and the contractor with the confidence necessary to achieve efficient productivity. In addition, infrastructure records are only as good as the "as built" drawings produced post construction, and these often Sack the desired accuracy, detail, or both.

To gain better information about these underground assets, utility companies have equipped their crews with camera systems and engage contractors to deploy inspection systems inside pipes such as a gas pipeline, sewer, or electrical conduit. Even though these robotic solutions can provide substantial financial and operational benefits, there are limitations to the existing technology. First, substantial post-processing efforts may be required to review the images created during inspections. Next, additional operational considerations and manpower are often needed to acquire accurate mapping to support operational-planning initiatives. Finally, even with accurate post-inspection reporting and mapping, the information is limited and typically includes only linear distance, such as the distance traveled by a robotic crawler, some limited feature description—e.g., identification of taps, joints, etc.—and hand-written notes created by the operator.

To identify different features and possible anomalies in pipes—e.g. gas pipelines, sewers, and conduits-using robotic camera systems, a highly-trained operator must carefully process the collected data and make proper assessments based on his or her experience. Manual processing of the data can provide valuable information to the service providers, but this process is time-consuming and requires a trained operator, which can Ire costly and inefficient. One of the challenges with current camera systems is that once they are deployed inside an asset, locating the system and accurately mapping its path under the ground is a manual process that requires a trained operator to perform. Global locating techniques such as GPS do not transmit through the ground, and traditional odometry used in the systems may not be recorded by the operator, may have accumulative error as they travel longer distances, or may not be accurate enough to enable keyhole excavation over targeted features of the pipe. These and other factors make it very difficult to accurately overlay buried infrastructure locations on the type of above-ground mapping systems typically used for planning purposes.

Another issue that must be addressed is that to achieve maximum accuracy, a low-frequency sonde often must be integrated into the system, and then, to properly locate an inspection robot within an asset, an operator must follow the robot along its path above the ground using a tuned receiver to identify and mark its location. This locating technique is time-consuming, costly, and very challenging, especially when the asset is a pipe that crosses areas with obstructions over the ground such as roadways, parked cars, or buildings.

SUMMARY

Embodiments described herein may include a system having one or more processors configured to execute a software program or programs that can autonomously review new and legacy videos collected by camera-equipped robotic and other remotely-deployable camera systems from inside the pipes, and automatically detect and categorize different features that would otherwise only be recognizable by a highly-trained and experienced operator. The system may also generate three-dimensional (3D) point clouds using algorithms that stitch together like features identified in different video frames.

Embodiments described herein may include a combination hardware and software system that uses one or more cameras to determine the location of a robot inside a pipe and geotag detected features with limited assistance from sensors, devices, or extra operators above the ground.)

Embodiments described herein may include a robotic system equipped with one or more cameras—potentially capable of stereo vison—along with software algorithms to create 3D point clouds, color, texture, or some combination of these. In addition to or in place of the cameras. LiDAR may be employed by embodiments described herein.

Embodiments described herein may include one or more of the following features. A trained neural network may be used to autonomously identify features inside an asset. As described above, assets may include such things as gas pipelines, sewer or other discharge pipes, or electrical conduits, just to name a few. Features of interest in any of these assets may include structural features such as pipe joints, taps, valves, or features related to the condition of the asset, such as points of corrosion, cracks, etc. Three-dimensional point clouds or other types of models can be generated using newly-captured and legacy video. External cameras or sensors may be used to locate the asset from above ground so it can be identified in relation to above-ground maps. The generated point clouds may be used to create accurate tool paths for repair maintenance, and sensing using automated or semi-automated tooling. External data can be linked with internal data to merge with existing mapping and GIS systems. A calibration algorithm can be included to enable the use of off-the-shelf and legacy camera systems to enable wider adoption and reduction in costs—i.e., there play be little or no replacement costs for legacy equipment because it may be calibrated to perform embodiments described herein.

Embodiments described herein may include automatic feature detection and 3D point cloud creation. Automatic processing of videos collected from the inside of pipes ma occur without human supervision using machine-learning techniques. More specifically, a database of features can be used to train a machine-learning model. This trained model can later be used without human supervision to automatically identify these features in the videos captured by the cameras on board of an in-pipe robotic system. Detection and categorization of features, including possible anomalies—e.g., cracks, defects, water ingress, etc.—inside buried assets can be automated to enable automatic report generation. The reports can be developed according to the standards and the level of detail defined by she service providers and may help eliminate human error and time-consuming post processing and video review while improving the quality of inspection that is currently being done by human operators.

Feature detection in the system may be based on image processing and machine-learning algorithms; therefore, every test conducted by the system may be used as a new training-set for improving the accuracy of the system in future tests. In other words, the system may rely on adaptive learning and it may mature as it is being used by operators. A properly trained system may process camera feeds in near real-time and alert the operator as the robot approaches different features and obstacles inside the pipeline. Embodiments may also provide for automatic determination of debris levels for pipeline utilization calculations.

Embodiments described herein may provide algorithms for locating and mapping utility-infrastructure assets to facilitate preventative and repair maintenance. Algorithms may be configured to provide detailed maps of inspected pipes with identified locations of relevant features detected inside the pipe—for example, the location and size of different services lines, pipe joints, valves, etc. Algorithms may also be configured to overlay the inspected path on above-ground maps or integrate it into a GIS for future references and operations. Features and point clouds may be automatically captured outside of the asset, above ground—for example, buildings, trees, street locations, etc.—using externally located camera systems. This data may be used to locate the position of the camera or robotic system inside the pipeline to provide direction, GPS position and geographical context.

A "Simultaneous Localization and Mapping" (SLAM) algorithm may be used for locating a robot inside a pipe with limited, or in some cases without any, external signal transmitted from above the ground by an operator. Accurate locating of the robot inside the pipe may enable the system to create a detailed geotagged map of the inspected pipelines. Embodiments may include a multilayer deep learning algorithm that once trained properly, can detect different features inside the pipe and which is capable of improving its accuracy as it is used by trained operators.

Embodiments described herein may include a system for data acquisition that includes a first transport module operable to move along a desired path. The first transport module may include a first positioning system configured to provide information related to its relative position. A first pair of video cameras may be such that each of the video cameras is carried by the first transport module at different positions on the first transport module. The first video cameras may be configured to capture video images as the first transport module is moving along a first path. The system may also include a first control system having at feast one first processor and configured to, among other things, receive information related to the captured images from the first pair of video cameras. The first control system with the at least one first processor may also be configured to identify a plurality of selected features from the information received front the first pair of video cameras, determine a distance from the first transport module to each of the selected features for each of a plurality of frames in the captured video images, process the images to generate a first three-dimensional (3-D) point cloud of the selected features, and use the first 3-D point cloud to create a map of the first path.

Embodiments described herein may include a system for data acquisition that includes a first transport module operable to move along a desired path. The first transport module may include a positioning system configured to provide information related to its relative position. A first video camera may be carried by the first transport module and configured to capture video images as the first transport module is moving along a first path. A first control system having at least one first processor may be configured to, among other things, receive information related to the captured images from the first video camera. The first control system may further be configured to identify a plurality of selected features from the information received from the first video camera, process the images to generate a first three-dimensional (3-D) point cloud of the selected features, and use the first 3-D point cloud to create a map of the first path. The embodiments may also include a second transport module operable to move along a desired path, and a second video camera carried by the second transport module and configured to capture video images as the second transport module is moving along a second path. A second control system having at least one second processor may be configured to receive information related to the captured images from the second video camera, and to identify a plurality of selected features from the information received from the second video camera. The second control system may also be configured to process the captured video images of the second video camera to generate a three-dimensional (3-D) point cloud of the selected features related to the second path. The second control system ma then use the 3-D point cloud related to the second path to create a map of the second path.

Embodiments described herein may include a method for data acquisition that includes capturing video images with a first video camera as the first video camera is moved along a first path. The method may also include gathering data related to a position of the first camera as it moves along a first path and analyzing information related to the captured images from the first video camera using at least one first processor. The method may further include identifying a plurality of selected features from the information received from the first video camera using the at least one first processor and generating a first three-dimensional (3-D) point cloud of the selected features using the at least one first processor. The first 3-D point cloud may be used to create a map of the first path. In some embodiments, the method may also include capturing video images with a second video camera as the second video camera is moving along a second path. The information related to the captured images from the second video camera may then be analyzed using at least one second processor, and a plurality of selected features from the information received from the second video camera identified using the at least one second processor. A second three-dimensional (3-D) point cloud of the selected features related to the second path may then be generated using the at least one second processor, and the 3-D point cloud related to the second path may be used to create a map of the second path.

BRIEF DESCRIPTION OF THE DRAWINGS

FIG. 3B shows the area outside of the pipe with control points superimposed on the image;

FIG. 4 shows a fine representing the position of the pipe in FIG. 1 superimposed on the above-ground image;

FIG. 13 shows a schematic diagram illustrating more details of the method for correlating data inside and outside of the pipe.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
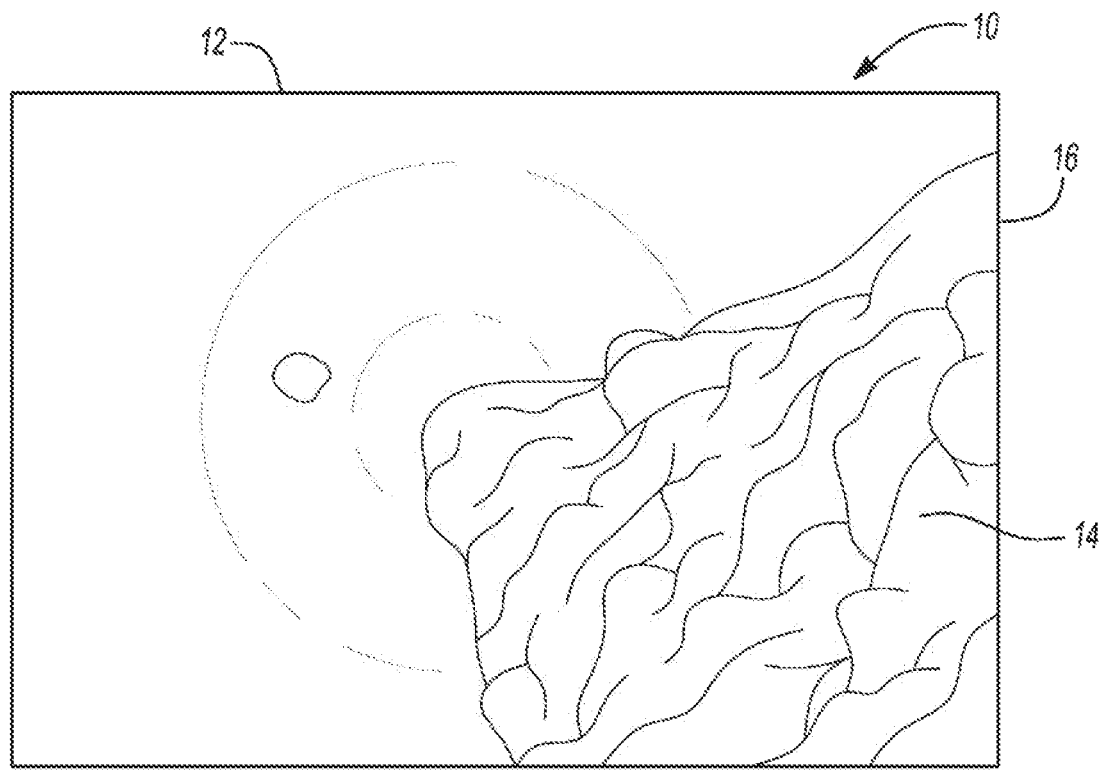
FIG. 1A shows a representation of an image captured from inside a pipe having significant corrosion along the inside wall.
Figure 1B:
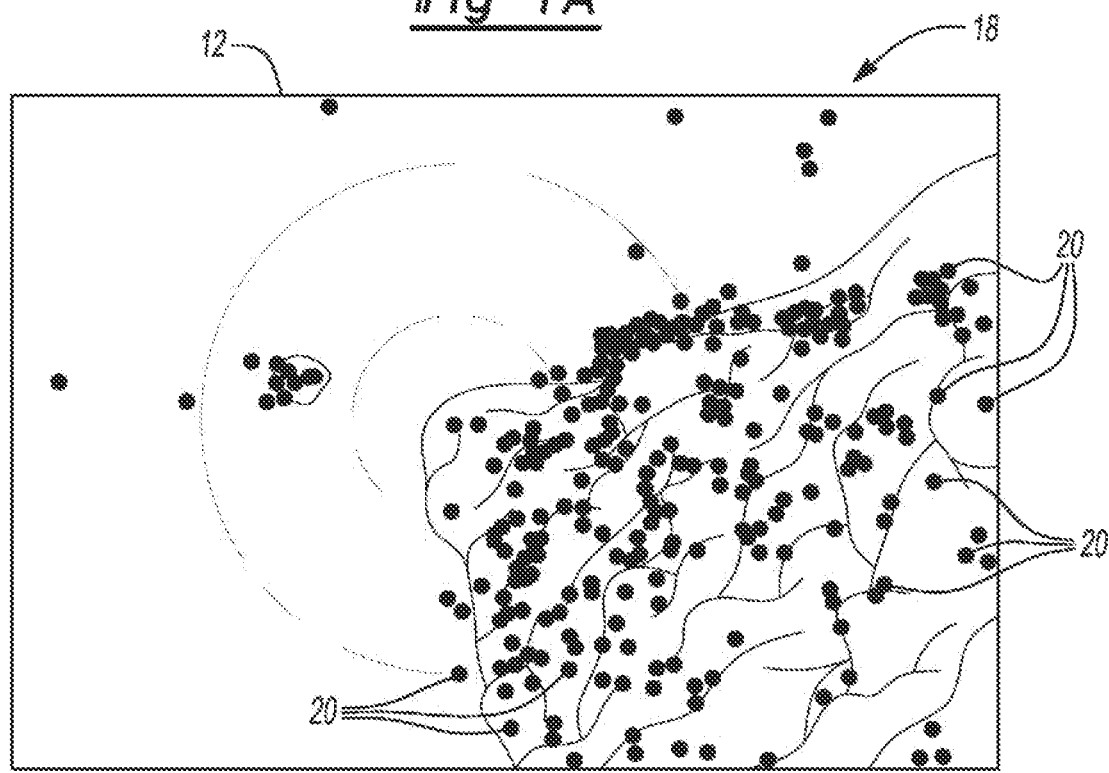
FIG. 1B shows the inside of the pipe from FIG. 1 with control points superimposed on the image.

FIG. 1A shows a view 10 of the inside of a pipe 12, which may be, for example, an underground gas pipeline, having a considerable amount of corrosion material 14 built-up along a portion of an inside wall 16. As described below, the pipe 12 can be mapped using embodiments described herein. Another view 18 shown in FIG. 1B illustrates the inside of the pipe 12 with a number of control points 20—not all of which are labeled-superimposed at various points on the inside of the pipe 12. The control points 12 may be generated, for example, by analyzing individual frames of a video image taken from inside the pipe 12. For example, the first view 10 represents a single frame of a video taken by a robotic system moving along the inside wall 16 of the pipe 12, Various features inside the pipe 12—e.g., specific landmarks such as access holes, service connections, and other features that can be captured by a camera—can be identified as control points in the image shown in FIG. 10.

Successive frames can be analyzed and the same landmarks, or features, identified. Because the camera is carried by a robotic system that is moving along a first path through the pipe, the same feature will appear at different positions in the captured frame. Since the features appearing in multiple consecutive frames are stationary, using proper camera calibration by comparing the relative distance between these points in multiple frames, the robot's displacement can be calculated. When enough of these identified features-represented by data points or control points—are laid out relative to each other, an accurate map of the pipe 12 can also be created. This is shown as a point cloud 22 in FIG. 7. Because the relative location of the robotic system vis-à-vis the features it has identified with its camera is known, a line 24 depicting an accurate representation of the track of the robotic system can be identified.

Figure 3A:
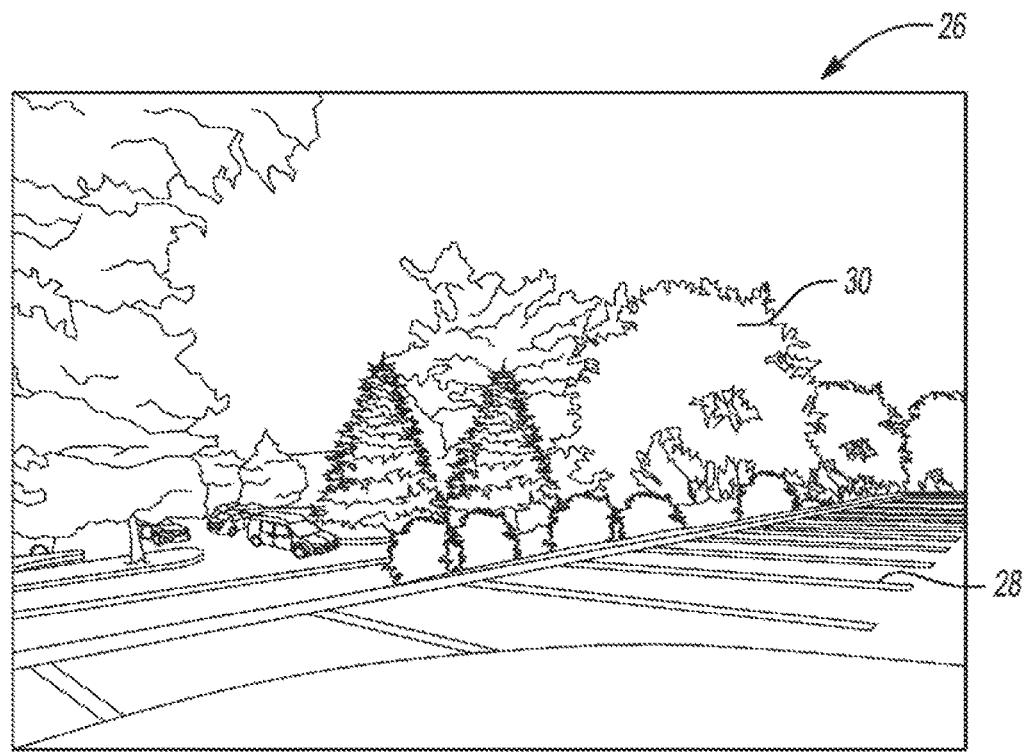
FIG. 3A shows a representation captured above ground outside of the pipe.

As described above, one way that embodiments may be useful for maintaining and servicing underground assets is to accurately locate the pipeline or other asset on an above-ground map. This is illustrated in FIGS. 3-4. In FIG. 3A, a first view 26 shows an area above the ground, and in particular, shows a parking lot 28 and trees 30. An above-ground vehicle, or even an individual on foot, can take a video of the area while travelling along a second path. The second path may generally coincide with the first path taken by the robotic system in the pipe as described above The first, or below ground, path and the second, or above-ground path, may be initially correlated because the entry point of the robotic system is known. The above-ground path can also use the entry point as a starting location for the video and data collection. The vehicle or person above the ground can then follow the same general path that the robotic system followed underground. Thus, the second path—i.e., the above-ground path—may be coincident with the first path—i.e., the underground path traversed by the robotic system. Of course, it may not be possible to follow the exact same path because of trees, buildings, or other obstructions above ground, but in at least some embodiments, at least a part of the second path will be coincident with the first path. As used in this context, "coincident" does not contemplate an exact duplication of paths, which may be possible in theory only; rather, it contemplates a close matching of paths within the limits of distance and location measurements.

In other embodiments, the first and second paths may not be chosen to generally coincide with each other. In fact, the term "path" as used herein does not require any particular rectilinear, curvilinear, or rotational motion, rather, it defines a universe of space from which data is collected. For example, the robotic system described above traversing the inside of a pipe may travel along a generally rectilinear path having 45° and 90° bends. The above-ground path may be limited by obstacles and therefore may be serpentine, zig-zag, or some other shape or shapes. In still other embodiments, a system collecting data may "move" along a path by rotating or it may even remain stationary to gather data in three-dimensional space—e.g., a sphere, hemisphere, or some other three-dimensional shape. Therefore, in these embodiments, the term "path" refers to the space from which the data was collected. Although some paths may be pre-defined, such as in the case of a robotic system in a pipeline, other paths may be subject to change based on conditions of the environment such as obstacles, and some paths may even be randomly defined based on autonomous or semi-autonomous movement of a system.

Once the above-ground video has been recorded, it can then be analyzed frame-by-frame in the same way that the underground video was analyzed. Specific features found above the ground can then be identified in successive frames, and because the speed of the vehicle or person is known, for example, by using global positioning system (GPS), and the relative positions of the features to the vehicle or person can be calculated using camera calibration and classical computer vision techniques such us triangulation, the features from the various frames can be mapped to create a three-dimensional image of control points. This is shown in another view 32 of the same area in FIG. 3B, which shows control points 34—not all of which are labeled—superimposed on the image shown in the first view 26. For the above-ground image, the identified features may be items such as the stripes or other markings in tire parking lot 28, branches or leaves of the trees 30, or other visible features that can be captured by the camera.

When this is done for the entire path, an image can be created such as shown in the view 36 in FIG. 4. The trees 30 and the parking lot 28 are covered by the control points 34, which create 3-D point clouds. Because the location of the camera vis-à-vis the vehicle that the camera is mounted on can be identified very accurately, for example, using GPS and the distance of the camera to the various features can be measured using proper camera calibration, the above-ground path cast be depicted by a line 38 drawn relative to the data points 34. Because the entry point for the robotic system into the pipe is the same as the starling point for the above-ground path, the two paths can be superimposed on one another to provide an integrated map showing an accurate depiction of the underground map on and above-ground map. This gives operators an easy and accurate way to locate desired features of the underground assets. Although the data required to generate the below-ground map and the above-ground map may lre collected at the same time or very close its time to one another, embodiments described herein may also collect the two data sets with weeks or months in between them.

Having the locations of the below-ground asset and the above-ground infrastructure combined on a single map may provide significant advantages over currently available maps or other data. For example, an operator equipped with an augmented-reality vision system may be able to traverse a path above ground while viewing the underground asset—for example, through goggles being programmed with or otherwise accessing the below-ground map created as described above. In this way, important features of the underground asset can be coordinated with structures above ground in three-dimensional space. Another advantage of these types of maps may be realized in other applications, such as calculating volumes needed to back fill excavations. Information from the maps may also be used to plan for building structures around a construction site to support the work. Of course, the maps described above can also be superimposed onto traditional two dimensional maps to increase their value as well.

In addition to the advantages of a combined map that has both internal and external three-dimensional data, just having an internal map or an external map created as described above, may itself provide many advantages over currently-available information. With regard to internal maps, specific physical features inside a pipe can be identified by an operator reviewing images captured by a robotic system. These images can be tagged to identify specific features, such as valves, pipe connections, cracks, corrosion, etc. The system can then be programmed with these tagged features so that, on subsequent inspections, the tagged features are automatically identified by the system without operator intervention. Because different features may appear somewhat or significantly different in different pipes, or even in different portions of the same pipe, if desired, an operator can review the features that were automatically tagged by the system to confirm their accuracy, or edit the tag as appropriate. This new information can then be programmed back into the system to provide adaptive-learning feedback so that the system—e.g., thereby providing a type of machine learning-more accurately identifies these features with each new implementation. The kind of information gathered may include not just the identification of certain features, but also quantitative analysis—e.g., the quantity of debris in a location inside a pipe, the flow restriction experienced by a reduced diameter in the pipe, or the size as well as the quantity of pipe fittings.

External maps generated as described above may also be valuable without being correlated to underground assets. In part, this is because many utility or other infrastructure assets are partly or completely aboveground. For example, a pipe attached to the outside of a building may need to be inspected at each valve or connection point where a feedline enters the building. Systems is described herein can capture video along the length of the pipe—e.g., with an unmanned aerial vehicle (UAV)—and the video can be processed as described above. For example, in an initial video capture, an operator can review the video data and tag important features. The tagged features can be programmed hack into the system so that they are automatically identified in future implementations.

Figure 5:
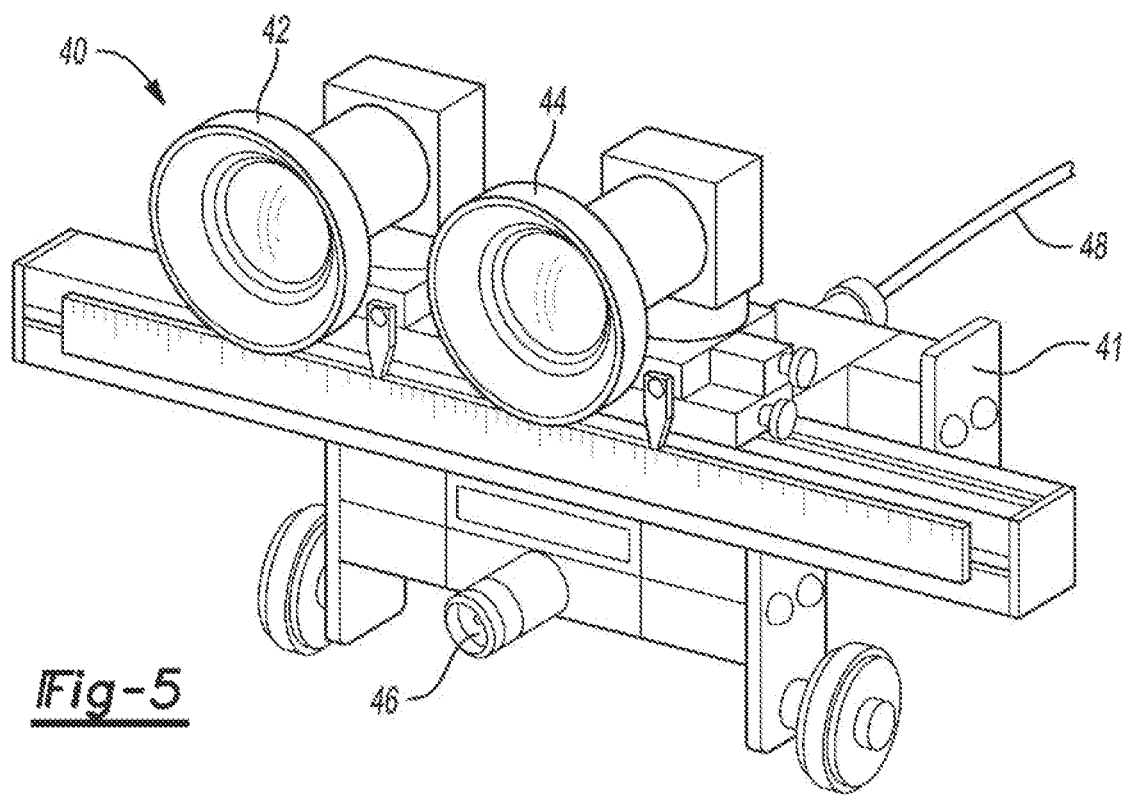
FIG. 5 shows a perspective view of a system in accordance with embodiments described herein.
Figure 6A:
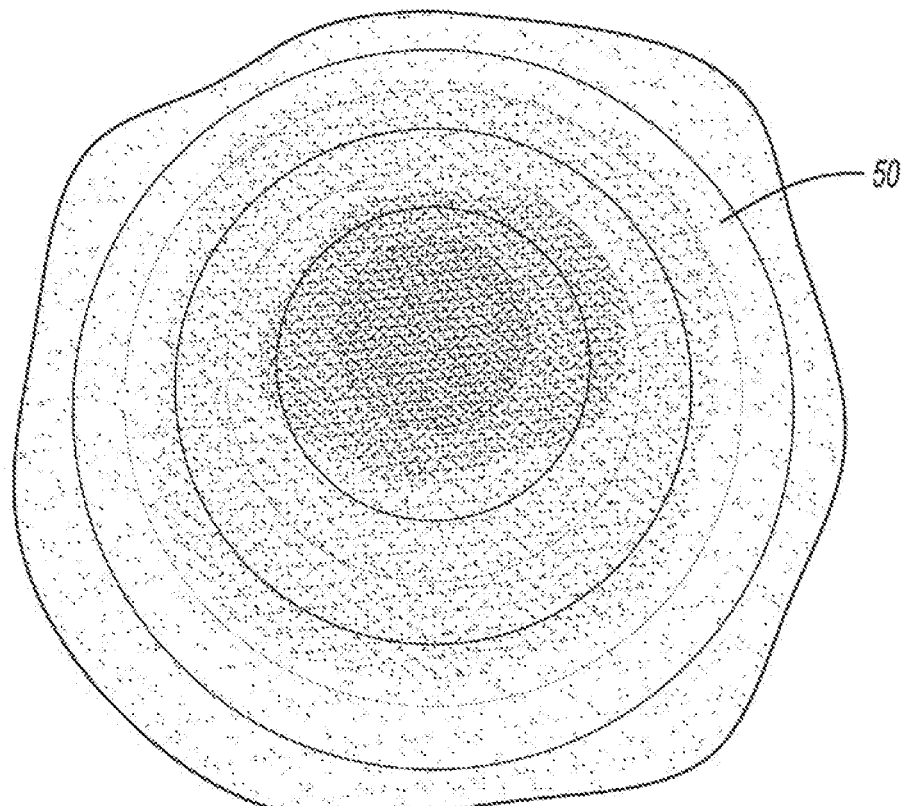
FIG. 6A shows the inside of the pipe to which embodiments described herein will be applied.

FIG. 5 shows a robotic system 40 in accordance with embodiments described herein. The robotic system 40 includes a transport module 41 and a pair of high-resolution video cameras 42, 44. This may provide an advantage over a single camera because having two images of the same feature from two different cameras that are accurately spaced from each other facilitates an accurate measurement of the distance between a feature captured by the cameras and the cameras themselves. A high-intensity light 46 and a communications cable 48 are also shown. The communications cable 48 the send data to, and may receive data from, a control system that has at least one processor configured to analyze and process data received, for example, from the cameras 42,44. FIG. 6A shows the inside of a pipe 50 into which a system, such as the robotic system 40 can be employed. The data from the videos captured by the robotic system 40 can be analyzed as described above, and a high-density three-dimensional point cloud 52 of the pipe 50 can be created. From the point cloud 52, a high-resolution model 51 can be generated—see FIG. 6B. From the model 51 of the pipe 50, corroded areas 54, 56 can be identified.

Figure 7:
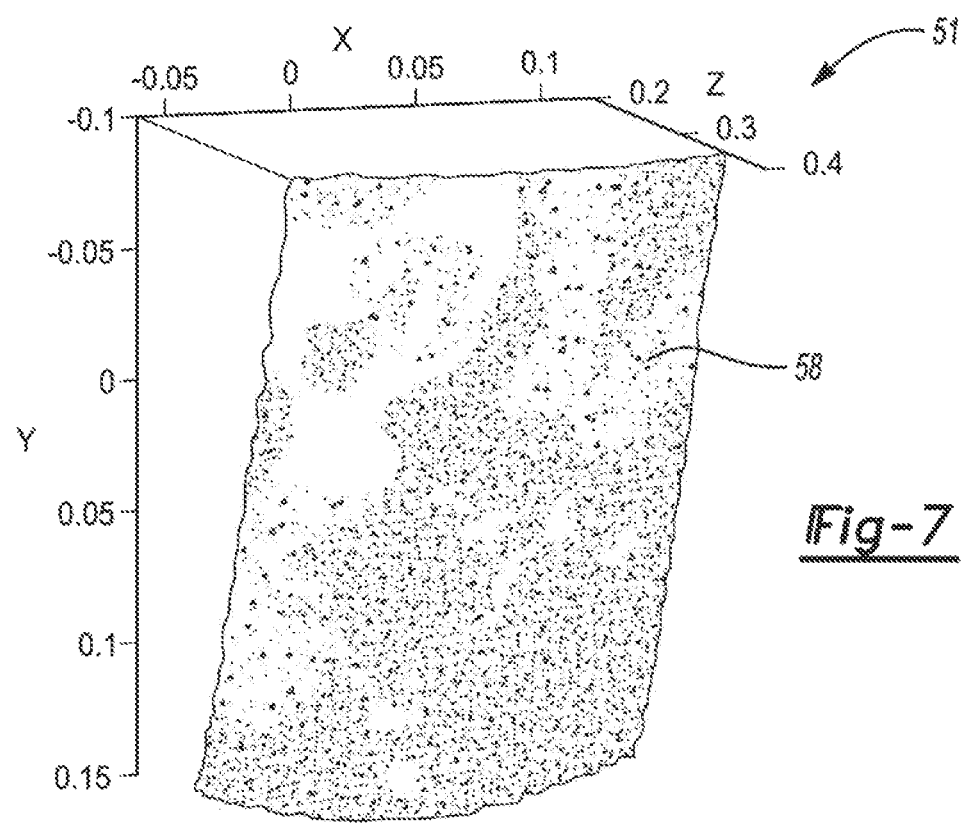
FIG. 7 shows a three-dimensional model of a pipeline surface generated using embodiments described herein.
Figure 8:
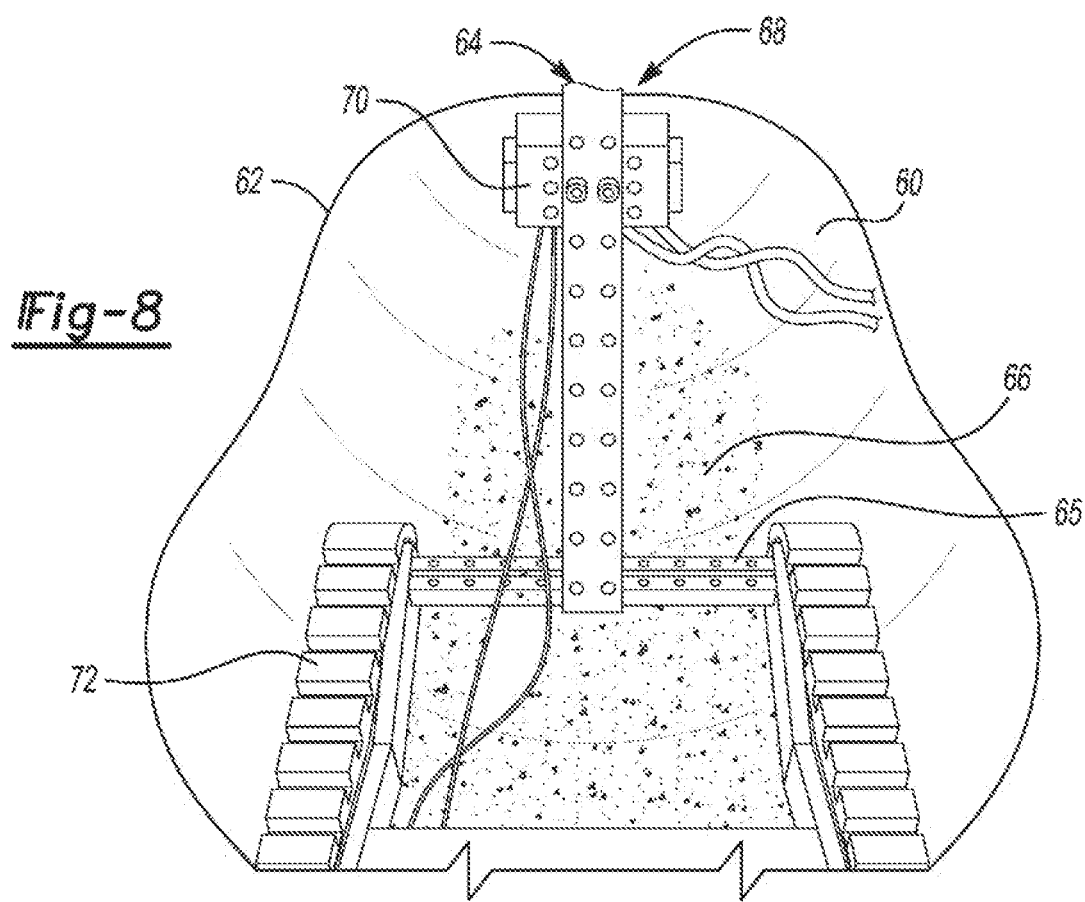
FIG. 8 shows a robotic system capturing data inside a pipeline in accordance with embodiments described herein.

FIG. 7 shows a portion 58 of the model 51 illustrating corrosion on the inside wall of a pipe, such as may be generated by the robotic system 40. Generating a 3-D model such as the model 51 may require color imaging so that color changes, the roughness of the wall surface, signs of cracks and deformation in the pipe wall can be analyzed to identify corrosion and deterioration. FIG. 8 shows an inside wall 60 of a pipeline 62 in which a robotic system 64 is traveling. As shown in FIG. 8, a large amount of corroded material 66 is built-up along the bottom of the inside wall 60. As described above, the robotic system 64 can capture video footage, which can later be analyzed to identify various features, and these features then used to generate a three-dimensional point cloud used for accurate mapping. In the embodiment shown in FIG. 8, the system 64 includes a transport module 65 that carries imaging equipment 68 on a frame 70 and is propelled through the pipeline 62 with a motorized continuous track propulsion 72.

Figure 9:
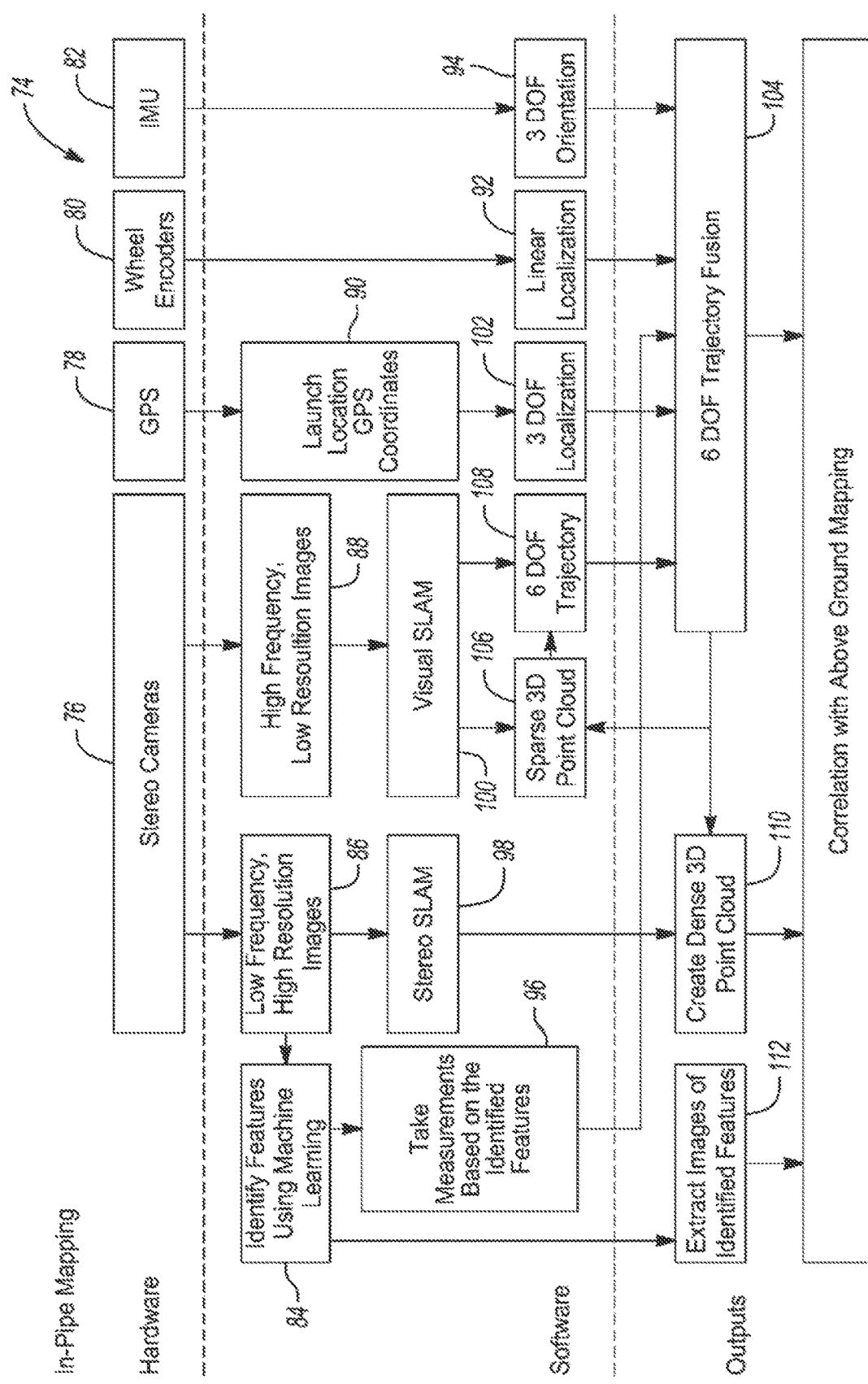
FIG. 9 shows a flowchart illustrating a method for capturing data inside a pipe in accordance with embodiments described herein.

FIG. 9 shows a flowchart 74 illustrating method steps in accordance with an embodiment described herein, specifically one that is directed to in-pipe mapping. The flowchart 74 is generally divided into three rows, illustrating portions of hardware, software, and various outputs that a system, such as the system 40 or the system 64 may perform. The designations of hardware and software m FIG. 9 may be different for different embodiments, for example some software may be embedded into hardware—commonly known as firmware. In addition, different systems may include different hardware configurations, software configurations, or both, and at least some of the steps in FIG. 9 may not be modified or not performed at all by some systems, which may also perform any number of different steps in accordance with embodiments described herein. Further, the software may be part of a control system and reside in a processor or processors within a mobile robotic system, or at least some of it may reside in processors external to the system, but which communicate with the system as it is operating. In this way, collected data may be processed in real time for example, with an onboard processor—or it may be stored for later processing, for example with a remote processor.

The system shown in FIG. 9 includes stereo cameras 76, GPS 78, wheel encoders 80, and an inertial measurement unit (NU) 82. These elements may be carried on a first transport module forming a part of a mobile robotic system. As described above, the stereo cameras help to provide measurement data because they capture the same image from two different angles from two cameras that are spaced from each other at a specific distance. The GPS 72 may not function when the system completely underground: however, it can be used to accurately identify the launch point where the system enters the pipe from above ground. The encoders 80 are used to measure the distance of travel for the system when it is in the pipe, and the IMU 82 may provide such information as angular rate and orientation of the system, all of which provides useful data for mapping the location of the robotic system inside the pipe.

That portion of the system identified as software in FIG. 9 performs a number of steps based on information it receives from the hardware. For example, at step 84 various features are identified using machine learning. As described above, this may include starting with an initial database of features such as pipe connections, access points, etc., which provides the mechanism for identifying the features as the system travels through the pipe. Then the database is augmented with additional information as new features are imaged and identified, which improves the accuracy for future mapping. The cameras 76 provide both low-frequency, high-resolution images 86 and high-frequency, low-resolution images 88, As described above, the UPS 78 provides launch location coordinates 90, and the wheel encoders 80 provide linear localization 92. The IMU 82 provides information related to the orientation of the system, which in this embodiment is a three-degree-of-freedom (DOF) orientation 94.

When the features are identified using machine learning at step 84, measurements can then be taken at step 96 based on these identified features. For example, the distance between the feature and the mobile system can be measured for each captured feature. The images from she stereo cameras 76 are also used for simultaneous localization and mapping (SLAM)—the process described above—a stereo slant 98 and a single-camera visual slam 100, although in some embodiments only the stereo SLAM or the single-camera visual SLAM may be used. The position information regarding the initial launch location 90 is used to generate a three DOF localization at 102. This, along with the linear localization 92 and the three DOF orientation 94 are combined to create a six DOF fusion 104 of the trajectory of the system. The visual slam using low-resolution and high-frequency imaging 100 generates a 3-D point cloud, which in this embodiment, is a sparse 3-D point cloud 106, which also receives information from the initial six DOF trajectory fusion 104. This allows the generation of a separate six DOF trajectory at 108, which is fed hack into the six DOF trajectory fusion 104; this may significantly increase accuracy regarding the location of the system as it traverses the pipe.

Figure 2:
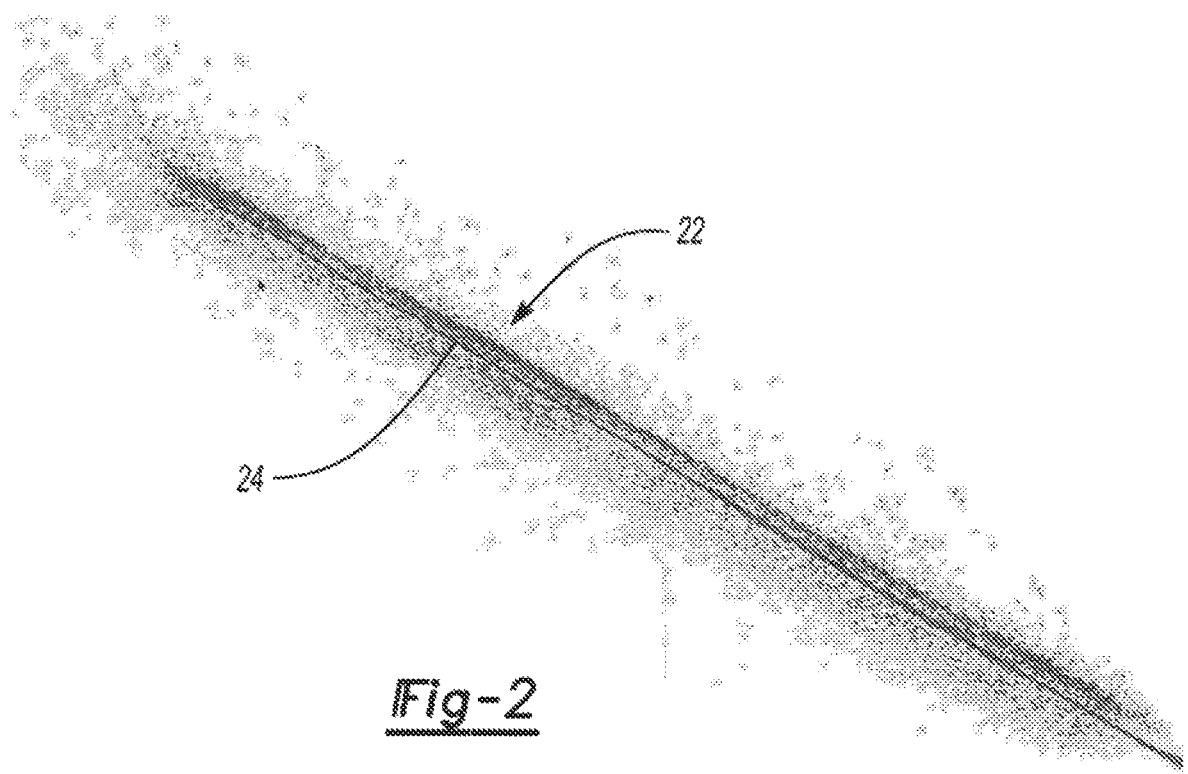
FIG. 2 shows a line representing the position of the pipe in FIG. 1 based on a point cloud generated from the data captured inside the pipe.
Figure 6B:
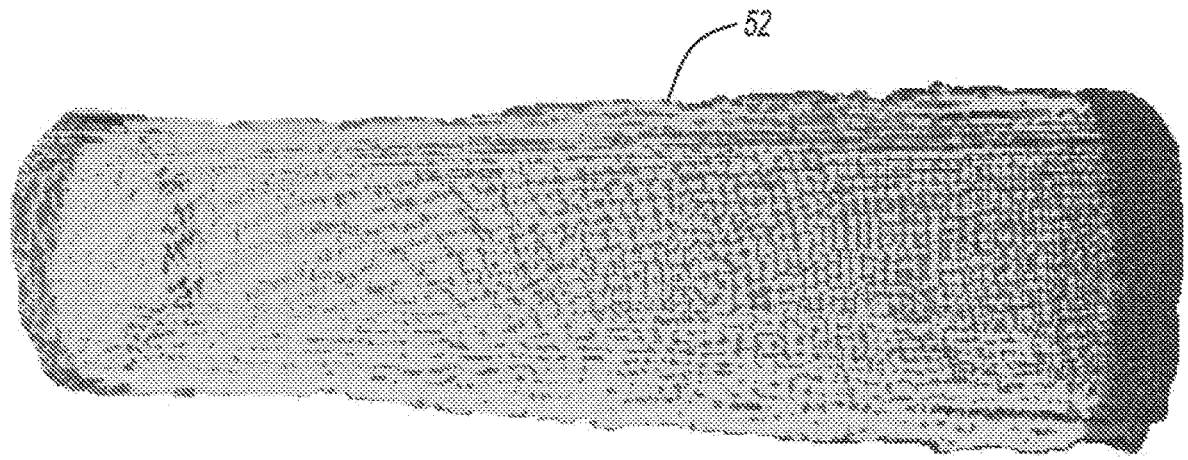
FIG. 6B shows a 3-D map of the pipe generated using embodiments described herein.
Figure 6C:
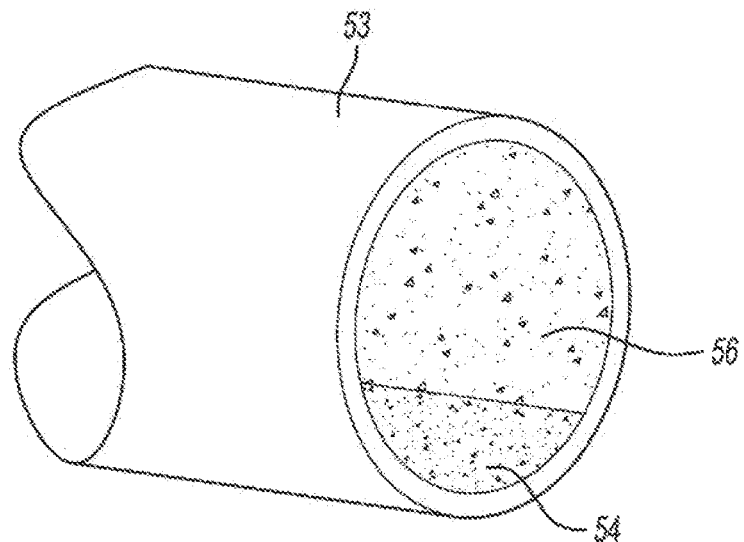
FIG. 6C shows areas of corrosion in the pipe identified using embodiments described herein.

The six DOF trajectory fusion 104 is also used in conjunction with information from the stereo slam using low-frequency and high-resolution imaging 98 to generate a 3-D point cloud, which in this embodiment is a dense 3-D point cloud 110, such as illustrated in FIGS. 2, 4, and 6B, The dense 3-D point cloud 110 may be conveniently referred to as a first 3-D point cloud because it is associated with the first transport module, but in systems using only a single camera, the sparse 3-D point cloud 106 generated by the visual SLAM 100 may be a first 3-D point cloud. Images of identified features are extracted at 112, and this information is combined with the point cloud 110 and the trajectory fusion information 104, and is forwarded to correlate with the above-ground mapping, which is described in more detail in FIG. 10.

Figure 10:
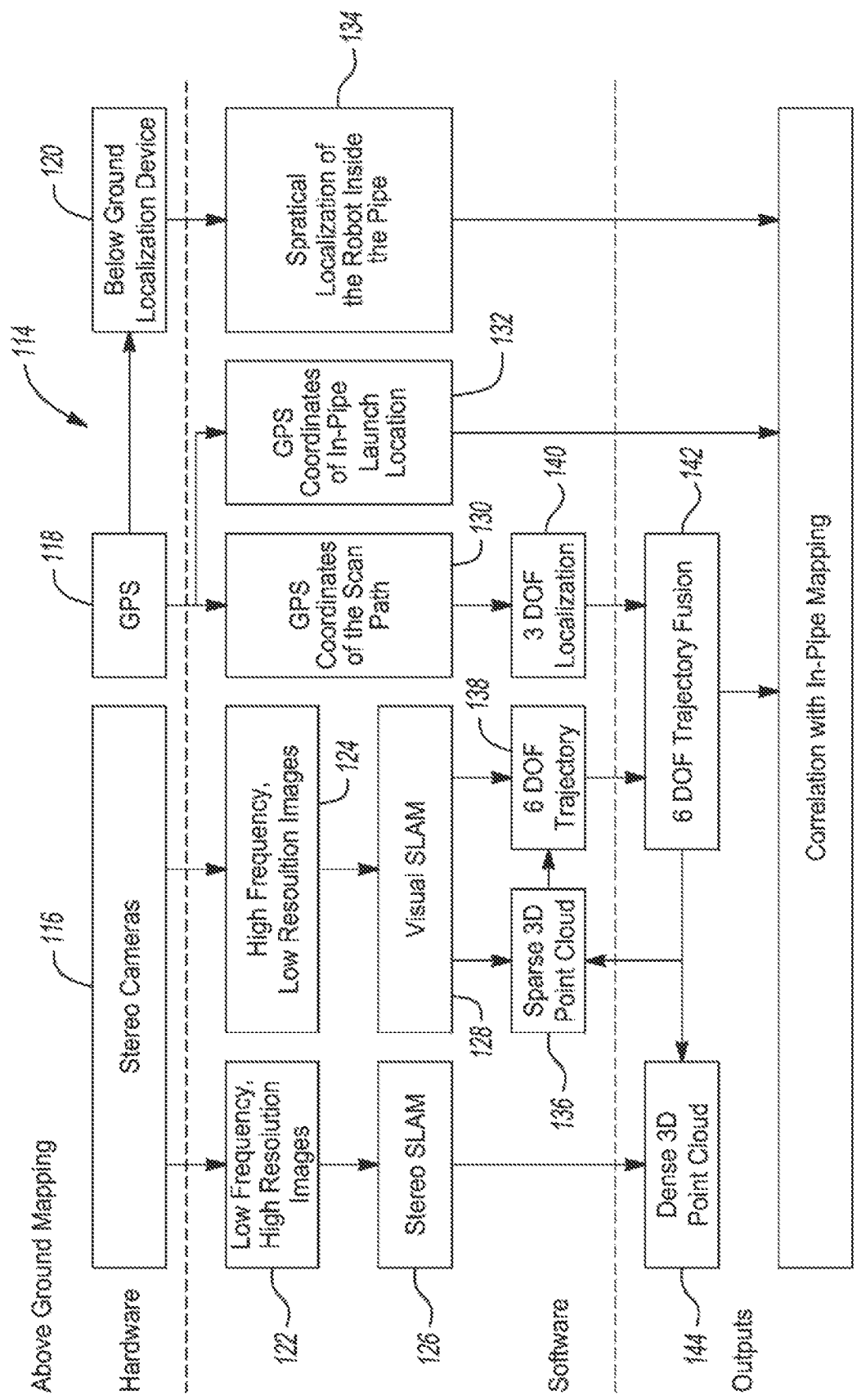
FIG. 10 shows a flowchart illustrating a method for capturing data outside of pipe in accordance with embodiments described herein.

FIG. 10 shows a flowchart 114 illustrating hardware and software, and method steps for above-ground mapping in accordance with embodiments described herein. Again, the designations of and software may vary for different embodiments, which may also output different information. The system includes some features similar to those used in the in-pipe mapping described in FIG. 9. For example, the system uses stereo cameras 116 and GPS 118. It also includes a below ground localization device 120, such as a sonde as described above. Some or all of these elements may be earned on a second transport module, which may be, for example, an aerial vehicle, a ground vehicle-including a robotic system such as used with the first transport module—or even a person.

Similar to the in-pipe system, the stereo cameras provide two types of images 122, 124, which are then used in a stereo slam process 126 in combination with a single-camera visual SLAM based on the high frequency and low resolution imagery of a single camera 128, respectively. As noted above, some embodiments may use only a stereo SLAM or a single-camera visual SLAM. In the above-ground system, the GPS 118 can be used to provide coordinates of the scan path, shown at 130, because it is able to communicate with satellites for most or all of the entire process. The GPS 118 is also used to coordinate the in-pipe launch location, shown at 132, to provide a common starting point that will be used to help coordinate the in-pipe and above-ground maps. Thus, the first path, which is travelled by the first transport module, may have at least one common position with the second path travelled by the second transport module. Alternatively, as described in more detail below, the first and second paths may not have a common position, but data gathered from the first path may have a known relationship to data gathered from the second path, and this known relationship can be used to correlate the two paths. The below-ground localization device 120 provides information regarding localization of the robotic system inside the pipe-see 134.

From the visual slam 128, a sparse 3-D point cloud is generated at 136 as is a six DOP trajectory at 138. The GPS coordinates of the scan path at 130 provide a three DOF localization of the system at 140, which is combined with the six DOF trajectory 138 to create a six DOF trajectory fusion at 142. This information is fed back into the 3-D point cloud 136, which helps to improve the accuracy of the six DOF trajectory 138. Output from the stereo SLAM process at 126 and information from the six DOF trajectory fusion 142 are combined at 144 to create a dense 3-D point cloud 144. The dense 3-D point cloud 144 may be conveniently referred to as a second 3-D point cloud because it is associated with the second transport module, but in systems using only a single camera, the sparse 3-D point cloud 136 generated by the visual SLAM 128 may be a second 3-D point cloud. The six DOF trajectory fusion 142, the GPS coordinates of the in-pipe launch location 132, and the localization information from the robot inside the pipe at 134 are used to correlate with the in-pipe mapping output from the steps shown in FIG. 9.

Figure 11:
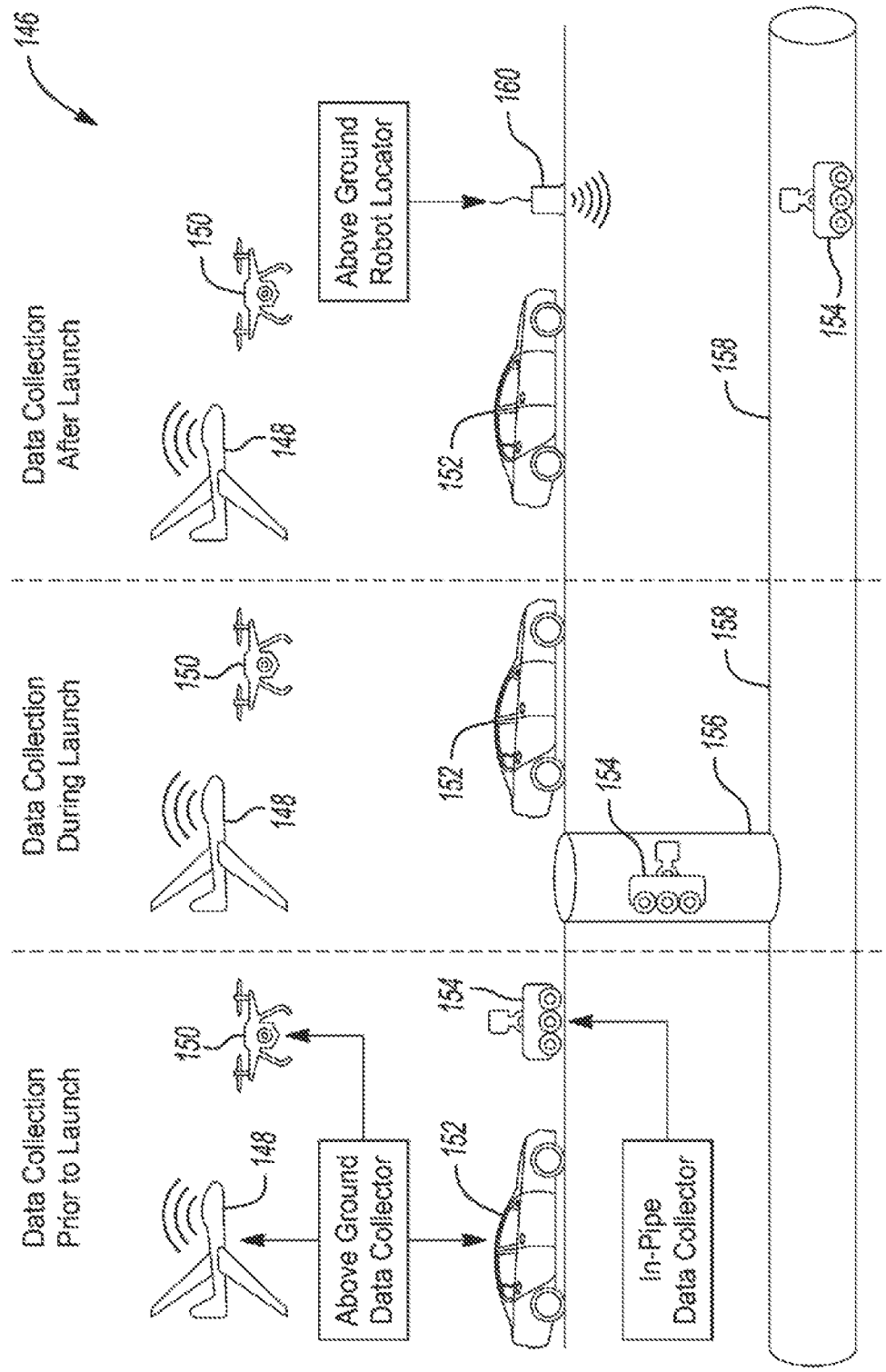
FIG. 11 shows a schematic representation a method tor correlating the data from inside the pipe with the data outside the pipe in accordance with embodiments described herein.

FIG. 11 provides a schematic diagram 146 illustrating the integration of the data from the in-pipe mapping and the above-ground mapping. This process was described above in conjunction with FIGS. 1-4. In general, data gathered by the system from the first path may have a known relationship to data gathered by the system iron the second path. For example, as described above, location of a launch entry point fora robotic system into a pipeline may provide common data for both the below ground path and the above-ground path, lit some embodiments, the two different paths do not necessarily include one that is below ground and one that is above ground; rather, both could be above ground or below ground. For example, if the first path defined a three dimensional space that included a first utility pole, and the second path defined a three-dimensional space that included a second utility pole, and the distance and direction between the two utility poles was known, then the map of the first path could be correlated with the map of the second path because of the known relationship of the utility poles, in general, a captured image or other data from the first path may have a known relationship with a captured image or other data from the second path, and this may allow the two paths, and maps of the two paths, to be correlated.

Returning to FIG. 11, in the first panel, data is collected prior to launching the system. For above-ground data collection, different types of vehicles, such as planes 148, drones 150, and automotive vehicles 152 may be used to traverse the path where the data is collected. As noted above, in some embodiments, a person may move along the path without the use of a vehicle. For the in-pipe mapping, a data collector such as a robotic system 154 may be conveniently employed, in the second panel of the schematic 146, data is collected during the launch of the robotic system 154 into a pipeline. Shown in the second pane is a launch tube 156, which provides access to the pipeline 158. Finally, in the third panel, data is collected after the launch both above ground and below ground. As described above, this data collection does not need to occur simultaneously, but can occur at different times in the data correlated and integrated after it is collected. As shown in the third panel, and above-ground locator 160, such as the localisation device 120 described in FIG. 10 is used to track a position of the robot 154 in the pipeline 158.

Figure 12:
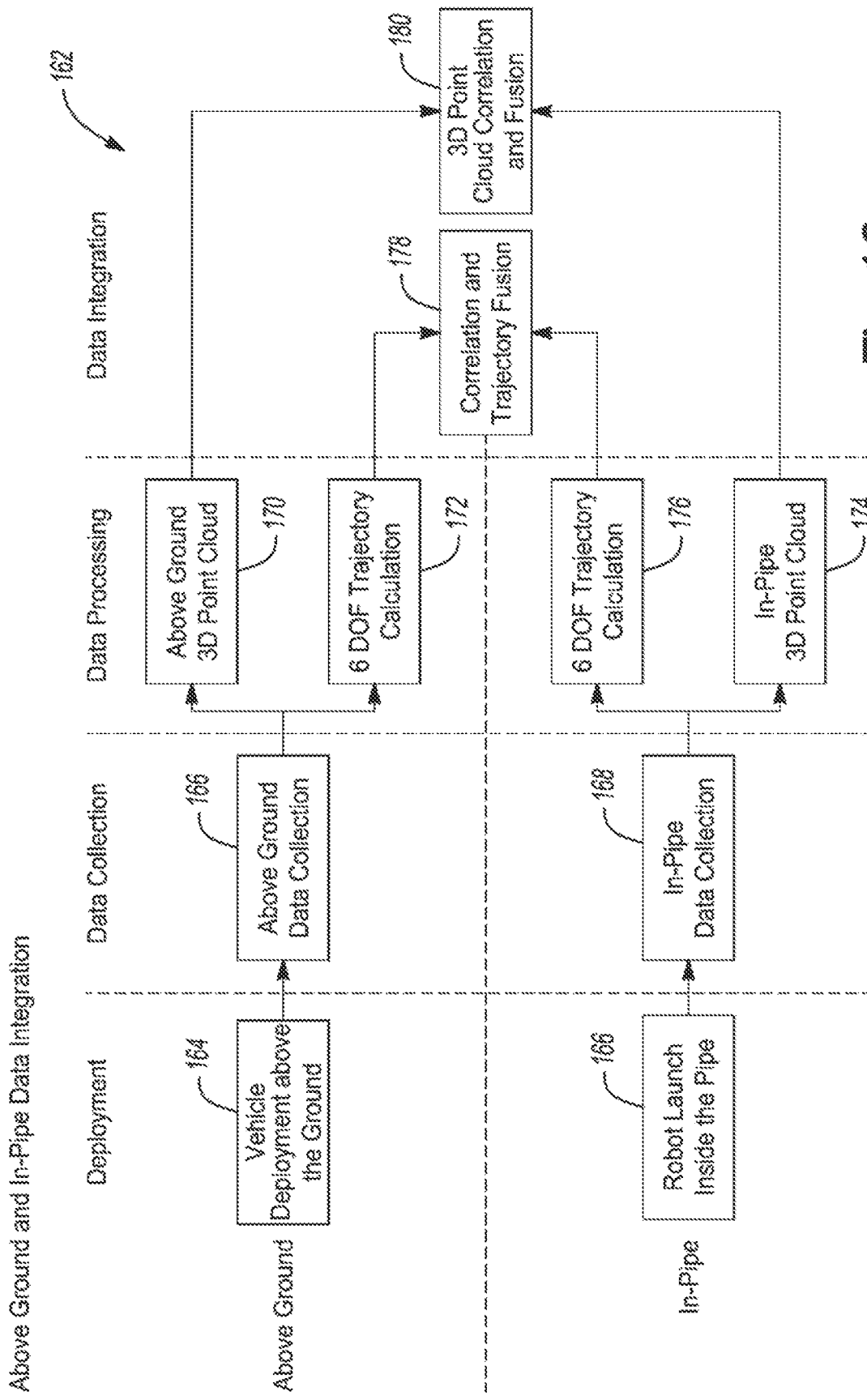
FIG. 12 shows a flowchart illustrating a method for correlating data inside and outside of the pipe.

FIGS. 12 and 13 described in more detail steps that may be used to integrate data collected, above ground and below ground. FIG. 12 shows a flowchart 162 illustrating steps involved in integrating data from in-pipe measurements and above-ground measurements. One piece of valuable information is that the launch position of the above-ground system 164 and the below-ground system 166 can be chosen to be the same, which provides a common data point. After launching, data is collected by the above-ground system at 166 and by the in-pipe system at 168. The details of this type of data collection are illustrated and described in conjunction with FIGS. 9 and 10, respectively. From the above-ground system a 3-D point cloud 170 is generated and a six DOP trajectory 172 is calculated see. e.g., the point cloud 144 and trajectory 142 described in conjunction with FIG. 10. For the in-pipe data collection system, a 3-D point cloud 174 and a six DOF trajectory 176 are also generated—see. e.g. the point cloud 110 and the trajectory 104 described in conjunction with FIG. 9. At step 178, the six DOF calculations 172 and 176 are correlated, and at step 180 the 3-D point clouds 170, 174 are correlated and fused. This may result, for example, in a map such as illustrated in FIG. 4.

FIG. 13 shows a schematic diagram 182 showing additional details of the integration of in-pipe data and above-ground data. As shown in the diagram 182, prior to launching the robotic system in the pipe, and prior to launching the above-ground system along its path, data is collected by both systems and then it is correlated and fused so that both systems have a common reference point. During the launch, data continues to be collected by both the in-pipe system and the above-ground system, for example, the position of each system relative to the access point of the pipe. After launching, data is collected from inside of the pipe as described above—e.g., in conjunction with FIG. 9. Similarly, data is collected from the above-ground system and the robotic system in the pipe is also located as described above e.g., in conjunction with FIG. 10. The data collected during the launch and after the launch is then correlated and fused to the pre-launch data, for example, as described in FIG. 12. Combining the data collected from the system inside the pipe and the data collected from outside the pipe facilitates generating an accurate map of the pipe or other asset, and this can be very helpful, for example, when preventative or repair maintenance needs to be performed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A system for data acquisition, comprising:
 a first transport module operable to move along a desired path, the first transport module including a first positioning system configured to provide information related to a relative position of the first transport module;
 a first pair of video cameras carried by the first transport module such that each of the video cameras of the first pair of video cameras is located at a different position on the first transport module and configured to capture video images as the first transport module is moving along a first path; and a first control system having at least one first processor and configured to:
  receive information related to the captured images from the first pair of video cameras,
  identify a plurality of selected features from the information received from the first pair of video cameras,
  determine a distance from the first pair of video cameras of the first transport module to each of the selected features for each of a plurality of frames in the captured video images,
  process the captured video images to generate a first three-dimensional (3-D) point cloud of the selected features, and
  use the first 3-D point cloud to create a map of the first path.

2. The system of claim 1, wherein the first control system is further configured to process the information related to the captured images from the first pair of video cameras using at least one simultaneous localization and mapping (SLAM) algorithm to generate the first 3-D point cloud.

3. The system of claim 2, wherein the first pair of video cameras is further configured to generate low-frequency, high-resolution images and high-frequency, low-resolution images, and the first control system is further configured to use the low-frequency, high-resolution images in a stereo SLAM process to generate the first 3-D point cloud.

4. The system of claim 3, wherein the first control system is further configured to use the high-frequency, low-resolution images in a visual SLAM process to generate a second 3-D point cloud and a first six degree-of-freedom (DOF) trajectory of the first transport module.

5. The system of claim 4, further comprising an inertial measurement unit (IMU) configured to calculate a three DOF orientation of the first transport module, and
  wherein the first control system is further configured to receive position information of the first transport module from the first positioning system and orientation information of the first transport module from the IMU, and to generate a second six DOF trajectory for the first transport module using the position information, the orientation information, and the first six DOF trajectory for the first transport module.

6. The system of claim 5, wherein the first control system is further configured to use the first six DOF trajectory of the first transport module to increase accuracy of the second six DOF trajectory of the first transport module.

7. The system of claim 1, further comprising:
a second transport module operable to move along a desired path;
a second pair of video cameras carried by the second transport module such that each of the video cameras of the second pair of video cameras is located at a different position on the second transport module and configured to capture video images as the second transport module is moving along a second path; and
a second control system having at least one second processor and configured to:
  receive information related to the captured images from the second pair of video cameras,
  identify a plurality of selected features from the information received from the second pair of video cameras,
  determine a distance from the second transport module to each of the selected features for each of a plurality of frames in the captured video images of the second pair of video cameras,
  process the captured video images of the second pair of cameras to generate a three-dimensional (3-D) point cloud of the selected features related to the second path, and
  use the 3-D point cloud related to the second path to create a map of the second path.

8. The system of claim 7, wherein one of the first control system or the second control system is further configured to correlate the map of the first path with the map of the second path to create an integrated map of the first and second paths.

9. The system of claim 7, further comprising a second positioning system operatively connected to the second control system and configured to determine a location of the first transport module as it moves along the first path.

10. A system for data acquisition, comprising:
a first transport module operable to move along a desired path, the first transport module including a positioning system configured to provide information related to a relative position of the first transport module;
a first video camera carried by the first transport module and configured to capture video images as the first transport module is moving along a first path;
a first control system having at least one first processor and configured to:
  receive information related to the captured images from the first video camera,
  identify a plurality of selected features from the information received from the first video camera,
  process the captured video images to generate a first three-dimensional (3-D) point cloud of the selected features, and
  use the first 3-D point cloud to create a map of the first path;
a second transport module operable to move along a desired path;
a second video camera carried by the second transport module and configured to capture video images as the second transport module is moving along a second path; and
a second control system having at least one second processor and configured to:
  receive information related to the captured images from the second video camera,
  identify a plurality of selected features from the information received from the second video camera,
  process the captured video images of the second video camera to generate a three-dimensional (3-D) point cloud of the selected features related to the second path, and use the 3-D point cloud related to the second path to create a map of the second path, and
wherein at least one of the first control system or the second control system is further configured to identify data from the first path having a known relationship to data from the second path.

11. The system of claim 10, wherein the first and second control systems are each configured to process the information related to the captured images from the first and second video cameras, respectively, using at least one SLAM algorithm to generate the first and second 3-D point clouds, respectively.

12. The system of claim 10, further comprising a first positioning system configured to provide information to the first control system related to a relative position of the first transport module.

13. The system of claim 10, further comprising an IMU in communication with the second control system and configured to calculate a three DOF orientation of the first transport module.

14. The system of claim 10, wherein at least one of the first control system or the second control system is further configured to use the identified data from the first path having a known relationship to data from the second path to correlate the map of the first path with the map of the second path to create an integrated map of the first and second paths.

15. The system of claim 10, further comprising a second positioning device operatively connected to the second control system and configured to determine a location of the first transport module as it moves along the first path.

16. The system of claim 15, wherein the first transport module is part of a robotic system operable to traverse an inside of an underground pipeline, and the second transport module is operable to traverse an area above ground over the pipeline.

17. The system of claim 16, wherein the second transport module is one of an aerial vehicle, a ground vehicle, or a person.

18. A method for data acquisition, comprising:
capturing video images with a first video camera as the first video camera is moved along a first path;
gathering data related to a position of the first video camera as it moves along a first path;
analyzing information related to the captured images from the first video camera using at least one first processor;
identifying a plurality of selected features from the information received from the first video camera using the at least one first processor;
generating a first three-dimensional (3-D) point cloud of the selected features using the at least one first processor;
using the first 3-D point cloud to create a map of the first path;
capturing video images with a second video camera as the second video camera is moving along a second path;
analyzing information related to the captured images from the second video camera using at least one second processor;
identifying a plurality of selected features from the information received from the second video camera using the at least one second processor;
generating a second three-dimensional (3-D) point cloud of the selected features related to the second path using the at least one second processor;
using the 3-D point cloud related to the second path to create a map of the second path; and
identifying data from the first path having a known relationship to data from the second path.

19. The method of claim 18, further comprising using the identified data from the first path having a known relationship to data from the second path to correlate the map of the first path with the map of the second path to create an integrated map of the first and second paths.

20. The method of claim 19, wherein at least some of the first path is through an underground structure and at least some of the second path is coincident with the first path.

* * * * *